United States Patent [19]
Fleming

[11] Patent Number: 6,102,761
[45] Date of Patent: Aug. 15, 2000

[54] CORD CONNECTOR DEVICE

[75] Inventor: Terry Fleming, Sydney, Australia

[73] Assignee: Manta Surfing Products Pty Ltd., Australia

[21] Appl. No.: 08/962,096

[22] Filed: Oct. 31, 1997

[30] Foreign Application Priority Data

Oct. 31, 1996 [AU] Australia ................................ PO3344

[51] Int. Cl.⁷ ................................................. B63B 35/79
[52] U.S. Cl. .................................. 441/75; 441/74; 24/105
[58] Field of Search .................................... 403/291, 206, 403/332; 24/297, 712.9, 3.13, 104, 105; 411/173, 177, 339, 338; 441/74, 75

[56] References Cited

U.S. PATENT DOCUMENTS

| 264,302 | 9/1882 | Joyce | 24/712.9 |
| 1,578,667 | 3/1926 | Kelsay | 411/338 |
| 4,267,615 | 5/1981 | Nealy | 24/104 X |
| 5,137,483 | 8/1992 | Nealy | 24/104 X |
| 5,154,655 | 10/1992 | Glydon | 441/75 |
| 5,338,237 | 8/1994 | Nealy | 441/74 |

FOREIGN PATENT DOCUMENTS

| 44259 | 6/1931 | Denmark | 24/712.9 |

Primary Examiner—Terry Lee Melius
Assistant Examiner—David E. Bochna
Attorney, Agent, or Firm—Londa & Gluck LLP

[57] ABSTRACT

A leg rope connector plug for a body board or surfboard, comprising a lower coupler means having a head member having essentially planar upper and lower surfaces, and a first shank extending therefrom; an upper coupler means having a head member having essentially planar upper and lower surfaces, and a second shank extending therefrom, said first and second shanks being engageable together to sandwich the body board or surfboard therebetween, and two substantially radially extending cut outs, each terminating in a recess, forming a small sector shaped area therebetween on the head member of the upper coupler means, and a web extending from the planar lower surface, said web being joined to the shank of the head.

3 Claims, 4 Drawing Sheets

CORD CONNECTOR DEVICE

BACKGROUND OF THE INVENTION

The present invention relates to an apparatus for connecting a cord to a device and more particularly to an apparatus for connecting a cord to a body board or surf board.

Body boards are a very popular means of surfing, and usually comprise a core of flexible foam plastics covered with an outer lay of tougher water proof plastics. It is a common practice for the surfer to use a leg rope to connect the body board to the surfer, to prevent the surfer from losing the board in the case of a fall. Connectors or leg rope plugs have been developed which are adapted to secure the leg ropes to the body board.

One such connector plug is disclosed in U.S. Pat. No. 4,267,615. In this disclosure there is a passage through the upper head of the connector through which the cord is run and looped back on itself and non releasably clamped together, to provide a connection between the cord and the body board. This type of connector is undesirable in that the leash connection and the clamped section of the leash extends above the upper surface of the body board, which can result in discomfort and even injury. Further the leash is not easily removed from the body board, without removing the connector plug.

A further type of plug connector is as shown in U.S. Pat. No. 5,137,483. In this connector plug the plug comprises a top member and a bottom member, which screw together to "sandwich" the body board between the two circular planar members. The upper member has a central hole therethrough, and a hole in the side of the neck communicating therewith. In use the leash is pushed into the central opening and out of the side hole and looped around the neck of the upper member. The upper member and lower member are then inserted into the hole in the body board and the two members are then screwed together sandwiching the body board therebetween and securing the leash to the body board. A problem with this type of connection is that the leash cannot be released from the body board without removing the connector plugs from the body board.

SUMMARY OF THE INVENTION

The present invention seeks to ameliorate this problem by providing a body board or surfboard leg rope connector plug which comprises:

- a lower coupler means having a head member having essentially planar upper and lower surfaces, and a shank extending therefrom;
- an upper coupler means having a head member having essentially planar upper and lower surfaces, and a shank extending therefrom, wherein, in use, the shanks of the upper and lower coupler means engage together to sandwich the board therebetween, securing the connector plug to the board; and
- at least one cutout, located on the upper coupler means, whereby, in use, a cord is forced between the upper surface of a board and the lower surface of the upper coupler mean and pull against the shank and releasably secured in said at least on cutout.

BRIEF DESCRIPTION OF THE DRAWINGS

The present invention will now be described by way of example with reference to the accompanying drawings, in which.

DETAILED DESCRIPTION OF THE INVENTION

Figure 1:
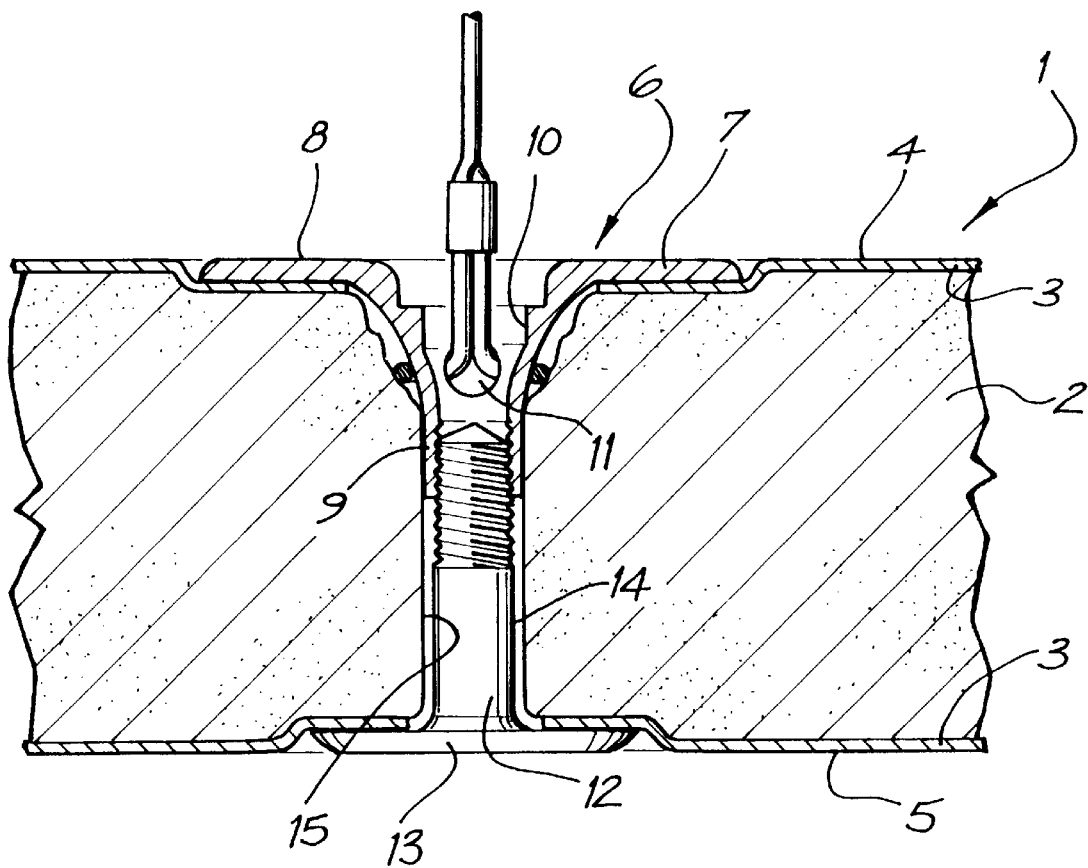
FIG. 1 illustrates a cross sectional view of a body board showing a prior art leg rope connector plug.

An existing leg rope connector is shown in FIG. 1. In this case the body board (1) comprises an core (2) of foam plastics with an outer skin (3) of tougher abrasive resistant material, forming an upper surface (4) on which the surfer lies or sits and a lower surface (5) which contacts the water.

The connector (6) comprises a an upper connector member (7) having a substantially annular planar head (8), and a shank (9) extending therefrom, and a lower connector member (12), having a substantially annular planar head (13), and a shank (14) extending therefrom. Either of the shanks (9 & 14) have a threaded bore and the other a complementary threaded surface. In use, a cord passes through the central shaft (10) and out through the hole (11) and is looped around the shank (9). The upper connector member (7) and the lower connector member are inserted into the hole (15) in the board (1) and the shanks (9 & 14) screwed together locking the connector (6) to the board (1).

As was mentioned previously once the connector is secured to the board the cord cannot be removed without removing the leg rope connector plug.

Figure 2:
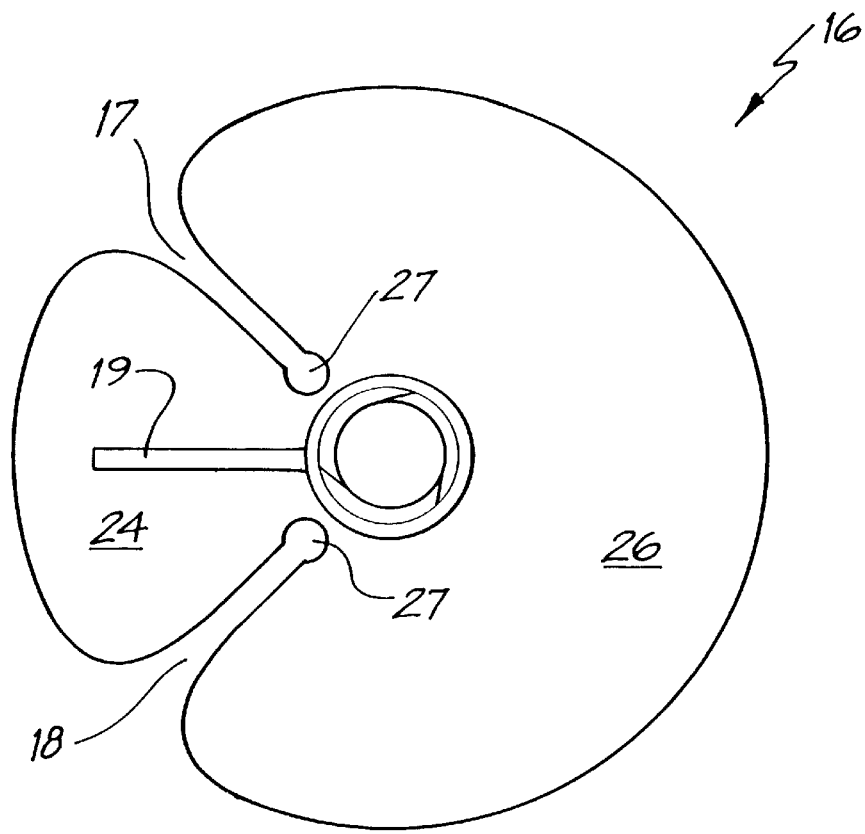
FIG. 2 illustrates a bottom plan view of the upper connector means of a leg rope connector of an embodiment of the present invention.
Figure 3:
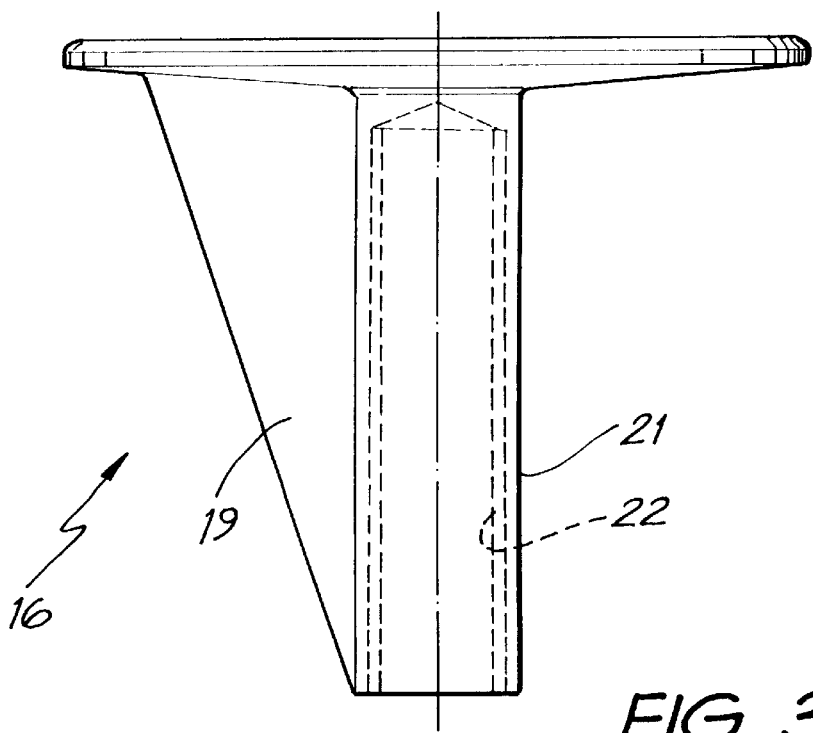
FIG. 3 illustrates a side view of the upper connector means illustrated in FIG. 2.

In the present invention, the embodiment as shown in FIGS. 2 & 3, comprise a specially shaped upper connector member (16), which comprises two cut outs (17 & 18), and a web (19) extending from the underside (20) of the smaller sector shaped area (24), bounded by the two key shaped cutouts (17 & 18) along the shank (21). The shank (21) has a threaded bore (22). The lower connector member (23), as shown in FIG. 5, can be similar to that of the prior art.

In use the leg rope connector plug of the present invention is inserted into the body board in a similar manner to existing leg rope plugs such as that shown in FIG. 1. However the web (19) aids in preventing the upper connector member (16) from rotating and also acts to some extent to reinforce the smaller sector shaped area (24), bounded by the two key shaped cutouts (17 & 18).

Figure 5:
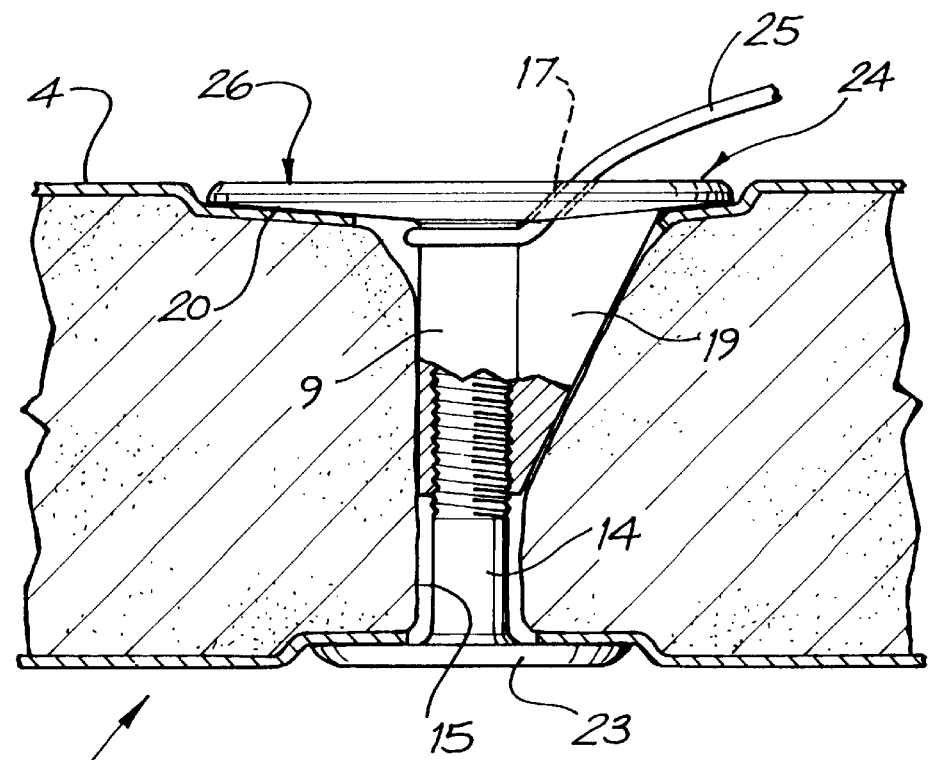
FIG. 5 illustrates a cross sectional view of a body board showing leg rope connector plug according to the embodiment of the present invention shown in FIGS. 2 & 3.
Figure 6:
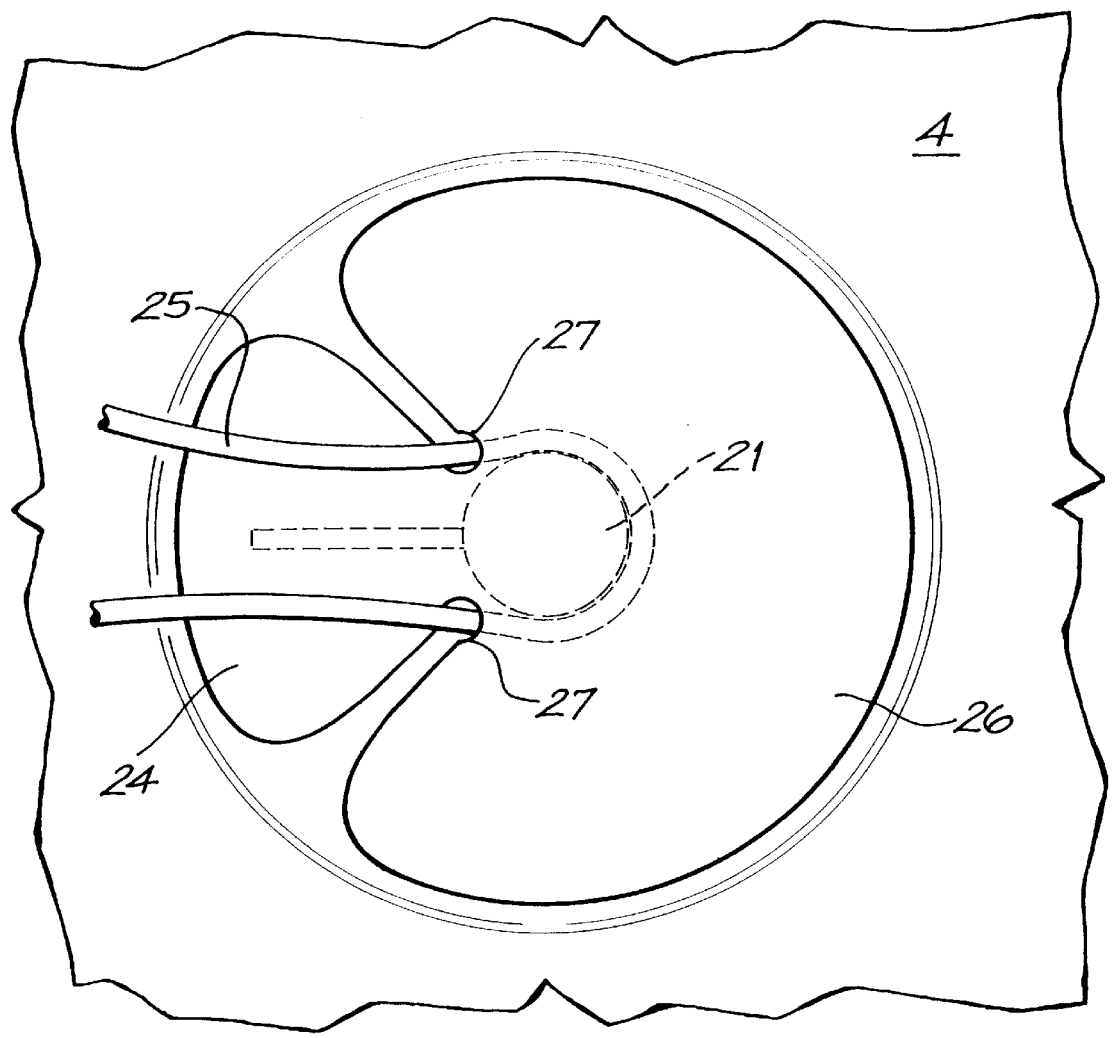
FIG. 6 illustrates a plan view of the area of the body board shown in FIG. 5.

To connect the cord (25), one forces a loop of the cord between the larger sector shaped area (26) and the upper surface (4) of the board (1) and pulls the cord (25) around the periphery of the larger sector shaped area (26) to engage into the key shaped cutouts (17 & 18), where the cord (25) tightens against the shank (21) and locks into the ends (27) of the key shaped cutouts (17 & 18), as shown in FIG. 5, securing the cord to the connector. Therefore as shown in FIG. 6 the cord (24) lies underneath the larger sector shaped area (26) and around the shank (21) and up through the ends (27) of the key shaped cutouts (17 & 18), such that the leg rope can be affixed to the body board.

To remove the cord (24) one disengages the cord (24) from the ends (27) of the key shaped cutouts (17 & 18)

sliding it along the key shaped cutouts (17 & 18) and around the periphery of and from underneath the larger sector shaped area (26), free of the connector (6).

Figure 4:
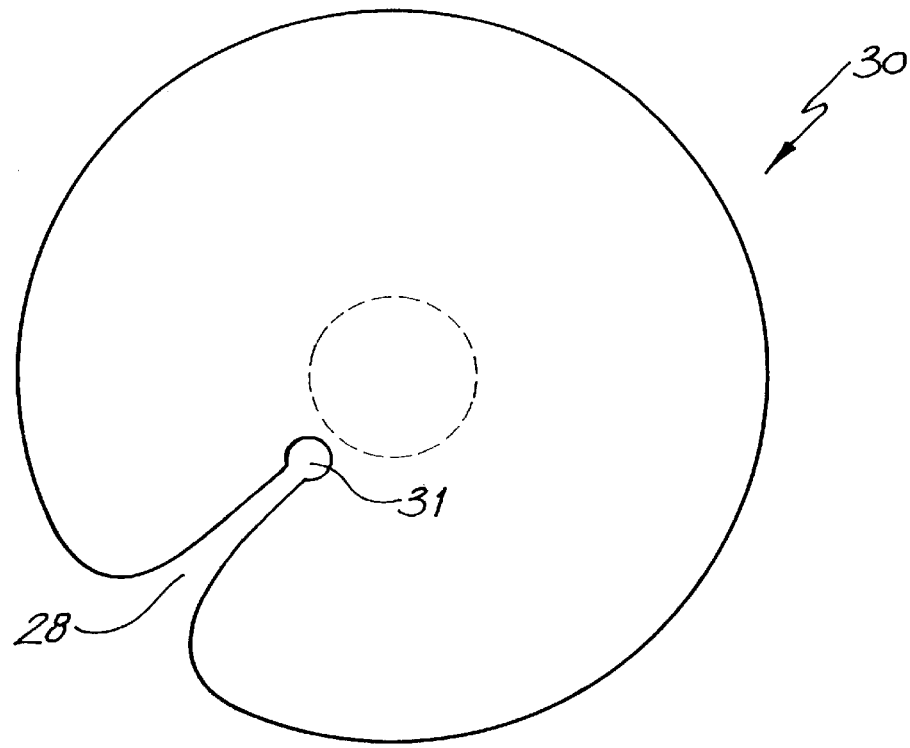
FIG. 4 illustrates a plan view of the upper connector means of a leg rope connector of another embodiment of the present invention.

A further embodiment is shown in FIG. 4 in which there is a single key shaped cutout (28) in the upper connector member (30). The connector is used in the same manner as the previous embodiment, except that both ends of the cord is pulled through the single key shaped cutout (28) after one forces a loop of the cord between the underside of the upper connector member (30) and the upper surface (4) of the board (1) and engages in the end (31) of the single key shaped cutout (28).

Further the leg rope connector plug could be made of any material but preferably is made from a suitable plastics. Whilst the leg rope connector has been described in use with a body board, it could be quite readily be used with a surf board or similar device.

The present invention therefore provides a leg rope connector plug which can be easily attached to and removed from a leg rope without removing the plug from the body board.

It should be obvious that alterations and modifications can be made to the described embodiments without departing from the scope and spirit of the present invention.

What is claimed is:

1. A leg rope connector plug for a body board or surfboard, comprising:
    a lower coupler means having a head member having essentially planar upper and lower surfaces, and a first shank extending therefrom;
    an upper coupler means having a head member having essentially planar upper and lower surfaces, and a second shank extending therefrom, said first and second shanks being engageable together to sandwich the body board or surfboard therebetween, and
    two substantially radially extending cut outs, each terminating in a recess, forming a small sector shaped area therebetween on the head member of the upper coupler means, and a web extending from the planar lower surface, said web being joined to the shank of the head.

2. A leg rope connector plug for a body board or a surfboard comprising:
    a lower coupler means having a head member having essentially planar upper and lower surfaces, and a first shank extending therefrom;
    an upper coupler means having a head member having essentially planar upper and lower surfaces, and a second shank extending therefrom, wherein, in use, the first and second shanks are threadedly engaged together to sandwich the body board or surfboard therebetween, securing the connector plug to the body board or surfboard, and
    two substantially radially extending keyhole shaped cutouts, located on the head member of the upper coupler means and defining on said head member a small sector and a large sector, and
    a web extending from the lower surface of the small sector of the head member of the upper coupler means and joining the second shank, the large sector of the head member of the upper connector having sufficient flexibility that, in use, a cord is forceable between the upper surface of the body board or surfboard and the lower surface of the upper coupler means and is pullable against the second shank and releasably secured in said substantially radially extending keyhole shaped cutouts.

3. A combination comprising:
    a board in the form of a body board or surfboard comprising an upper surface, a lower surface and a core therebetween,
    a leg rope comprising a cord attached to the board by way of a leg rope connector plug, and
    a connector plug comprising:
        a lower coupler means having a head member having essentially planar upper and lower surfaces, and a first shank extending therefrom,
        an upper coupler means having a head member having essentially planar upper and lower surfaces, and a second shank extending therefrom, wherein the first and second shanks penetrate through the board to engage together to sandwich the board therebetween and to secure the connector plug thereto, with the lower surface of the upper coupler means in contact with the upper surface of the board, and the upper surface of the lower coupler being in contact with the lower surface of the board, and
        at least one substantially radially extending keyhole shaped cutout, located on the head member of the upper coupler means, the head member of the upper coupler means having sufficient flexibility, such that the cord is forced between the upper surface of the board and the lower surface of the upper coupler means pulled against the second shank, and is thereby releasably secured in said at least one cutout;
    wherein the first and second shanks are threadingly engageable to each other;
    and said combination further comprises two substantially radially extending cutouts, each terminating in a recess wherein the two cutouts together define a small sector shaped area therebetween on the head member and the planar lower surface thereof has a web extending therefrom and joined to the second shank.

* * * * *